July 15, 1947.  H. S. BIMPSON ET AL  2,424,142
SOLAR SALT WATER DISTILLING APPARATUS
Filed Dec. 1, 1943
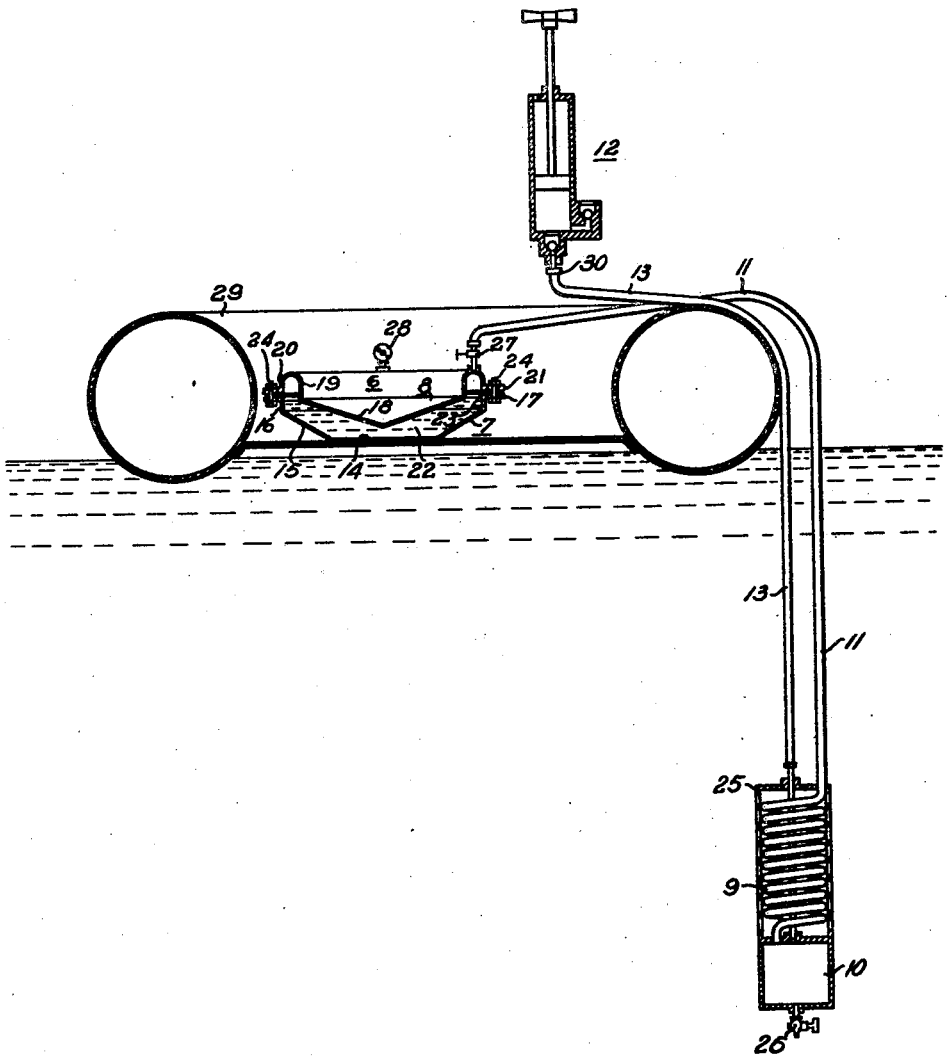
Inventors
Henry S. Bimpson
Ernest J. Palmer
by W. A. Lieber
Attorney Patented July 15, 1947

2,424,142

UNITED STATES PATENT OFFICE 2,424,142

SOLAR SALT WATER DISTILLING APPARATUS

Henry S. Bimpson, West Allis, Wis., and Ernest J. Palmer, Washington, D. C., assignors to Allis-Chalmers Manufacturing Company, Milwaukee, Wis., a corporation of Delaware Application December 1, 1943, Serial No. 512,515

4 Claims. (Cl. 202—163)

The present invention relates generally to improvements in the purification of liquids and relates more particularly to means for evaporating water by utilizing solar energy and recovering the condensate therefrom.

On numerous occasions it becomes necessary to evaporate salt water or the like, recovering the condensate to obtain a potable liquid. In the past, it has been common practice to evaporate liquids and recover the condensate therefrom for drinking purposes, but various concentrated and artificial sources of heat for causing evaporation as well as cooling systems for recovering the condensate are normally available and have therefore been utilized. However, due to increased transoceanic travel and the additional hazards encountered, it is necessary to provide equipment which is as light and compact as possible and which is operable from only such natural sources as solar energy, since fuel for heating is not always available on a life raft or the like. When only the energy of the sun is available as a heating medium, particular precautions must be taken to secure the highest practical degree of evaporation and optimum conditions must be maintained in the condenser. As previously stated, it is oftentimes necessary to provide persons lost at sea with equipment for supplying suitable drinking water and operable from solar energy only and in which the minimum of human energy is required to secure a sufficient quantity of potable water from the distillation of sea water.

It is therefore an object of the present invention to provide a salt water distilling apparatus operable with solar energy to produce a maximum amount of potable water with a minimum of effort.

Still another object of the present invention is to provide a combination of solar evaporator, condenser, hand pump, and flexible tubes, connecting these in series so as to permit ready submersion of the condenser in sea water while the evaporator and pump are located on a raft or the like.

Another object of this invention is to provide a distilling apparatus with an evaporator adapted to absorb a maximum amount of sun rays and most efficiently utilize these rays for evaporation purposes.

Other additional objects and advantages of the present invention will be apparent from the following detailed description.

A clear conception of a simple embodiment of the invention and of the mode of utilizing the improved apparatus, may be had by referring to the drawing forming a part of this specification wherein the various parts are referred to by suitable reference characters.

The single figure shown in the drawing is a schematic view of the improved apparatus, showing the same applied to an ordinary inflatable life raft.

Referring to the drawing, the device comprises in general an annular cup-shaped evaporator 6 having a lower casing 7 and a removable upper casing 8, a condenser coil 9 and receiver 10 connected to the evaporator 6 by means of a flexible tube 11, and a manually operable suction pump 12 likewise connected to the receiver 10 by a flexible tube 13.

The lower casing 7 is preferably provided with a flat base portion 14 and a conical bottom portion 15 terminating in a vertical cylindrical side wall portion 16 provided with a flange 17 at the peripheral edge thereof. The upper casing 8 is formed with an inverted conical bottom portion 18 having upright cylindrical concentric walls 19, 20 forming an annular vapor chamber; the outer wall 20 being provided with a flange 21 formed for cooperation with the flange 17 to maintain the casings 7, 8 in spaced relation and detachably interconnected. The two casings 7, 8 are of similar contour and are spaced apart so as to provide a relatively thin evaporating chamber 22 of considerable diameter; and the conical portion 18 of the upper casing 8 is so shaped that it will receive the direct rays of the sun at the most effective average heating angle. The flanges 17, 21 may be formed with annular grooves adapted to receive a toroidal gasket 23 or the like of elastic material, and clamps 24 are preferably provided on the flanges 17, 21 to form a vacuum tight joint for the lower and upper casings when united.

While the improved evaporator may be constructed as above described, it can also be formed in various other ways and without the use of separate clamps. The casing 7, 8 may be hinged on one side with a clamp on the opposite side and a sealing gasket between the flanges thereof, or means may be provided to pump or suck the proper amount of sea water into the evaporator without necessitating removal or separation of the casings except for cleaning purposes.

The shape of the evaporator is designed to allow the production of a high degree of vacuum therein without danger of collapse due to atmospheric pressure thereon as well as to receive the maximum solar energy. The evaporator is preferably made of spun aluminum or similar good heat conductive material resistive to the corrosion of sea water. All of the exposed surfaces are preferably blackened to increase heat absorption by some process such as anodic coloring of aluminum which is a treatment of the metal itself and does not provide intersurface faces retarding heat transfer as would probably be the case if the evaporator were merely coated. The evaporator is so formed as to expose as much as possible of the outer surfaces to the atmosphere and is also formed to maintain a maximum amount of sea water therein in continuous contact with the upper casing which is absorbing heat from the sun's rays.

The condenser coil 9 and receiver 10 are preferably formed of good heat conductive material capable of withstanding considerable abuse and immersion in sea water. The coil 9 is preferably provided with a perforated outer protective casing 25 and is rigidly attached to the receiver 10 at the top portion thereof, and the receiver 10 may be provided with a petcock 26 at the lower extremity to draw off the water condensate collected therein when desired. The coil 9 and receiver 10 are connected to the evaporator at the top of the annular space formed by the concentric walls 19, 20 by means of a flexible tube 11 preferably formed of heavy walled rubber adapted to withstand considerable pressure differences between the exterior and interior thereof without collapse and to be impervious to water and water vapor. The tube 11 may be provided with a manually operable valve 27 to shut off the passage between the evaporator and condenser when it is desired to draw water from the receiver 10, thereby preventing drainage of sea water from the evaporator.

Since evaporation is greatly facilitated when low pressure is maintained in the evaporator and condenser and incondensable gases contained in the sea water are continually removed, a manually operable suction pump 12 connecting with the receiver 10 by means of a flexible tube 13 has been provided. A vacuum gauge 28 may be provided on the annular space formed by the concentric walls 19, 20 and the desired pressure may be maintained in the system by operating the pump 12 to draw air from the receiver 10 and evaporator 6 through the tubes 11, 13.

In actual use, the lower evaporator casing is filled with sea water or the like and the upper casing is positioned thereover, displacing the water in the lower casing until it is substantially level with the flange 17. Thus the only air remaining in the evaporator is that which is trapped within the annular space between the walls 19, 20. The upper and lower casings are then tightly clamped together by means of clamps 24 or the like to seal the flanges 17, 21 thereof, and the evaporator may then be placed on the floor of the raft 29 or the like. The condensing coil 9 and receiver 10 are then immersed in the sea water and are suspended from the raft by means of tubes 11, 13. The pump 12 is then operated to remove the air remaining in the tube 13, receiver 10, coil 9, tube 11, and the evaporator 6, the pump preferably being operated until a vacuum approximately equivalent to twenty-nine inches of mercury is shown on the gauge 28. The heat absorbed by the evaporator from the sun will then cause the evaporation of the water within the evaporator and the condensate will be drawn through the tube 11 and condenser coil 9 wherein the cooling action of the sea water on the exterior of the coil will aid liquefaction and result in recovery of the distillate in the receiver 10. When drinking water is desired, the receiver may be pulled into the raft and potable water obtained therefrom by means of petcock 26 after valve 27 has been closed to prevent the sea water in the evaporator from backing up through the system. The air tube 13 must also be vented to allow air to flow into the receiver before water may be drawn therefrom. This may be accomplished by providing a threaded coupling 30 or the like at the upper end of the tube 13 formed for detachable engagement with the pump. When the distilling apparatus is not in use the flexible tubing 11 and 13 may be arranged in a coil adjacent to the cylindrical wall 19 with the condensing coil 9, the receiver 10 and the vacuum pump 12 disposed in the center of said coil and resting on the top surface of the evaporator 6. The inverted conical top surface of the evaporator 6 provides a desirable space for stowing this apparatus in a minimum of space, and yet the apparatus is completely connected and ready for use except for the insertion of the sea water and the dropping overboard of the condensing coil 9 and the receiver 10.

Actual tests have proven highly satisfactory and the effectiveness of the apparatus obviously varies in accordance with atmospheric conditions. The evaporator may also be formed of different sizes depending on the amount of water recovery desired.

While only one embodiment of the present invention has been illustrated and described herein, it is not the intention to restrict the scope of the invention thereto since various changes and modifications will be apparent to those skilled in the art.

It is claimed and desired to secure by Letters Patent:

1. A portable and unitary salt water purifying system and apparatus comprising, a pair of lightweight cup-shaped concentric annular casings detachably interconnected at the peripheries thereof to form an evaporator having a relatively thin evaporating chamber, the side walls of said casings forming an upwardly extending hollow rim projecting above the bottom of the upper casing to provide a vapor chamber, a condensing coil, a condensate receiver, means comprising flexible tubing for supportingly connecting said coil and said receiver to said vapor chamber, and a vacuum pump connected to said receiver by means of flexible tubing for producing a vacuum throughout said system.

2. A portable salt water purifying system comprising, a pair of lightweight cup-shaped annular casings detachably interconnected at the pehipheries thereof to form an evaporator having a relatively thin evaporating chamber adapted to receive liquid to be purified, said evaporator having the side walls of its casings extending upwardly beyond said point of peripheral interconnection to provide an annular vapor chamber above the surface of said liquid, a condensing coil, a condensate receiver, means comprising flexible tubing for supportingly connecting said coil and said receiver to said vapor chamber, and a vacuum pump connected to said receiver by means of flexible tubing for producing a vacuum throughout said system.

3. An evaporator comprising, a pair of cup-shaped concentric annular casings having cooperating surfaces spaced apart to provide a relatively thin evaporating chamber, the side walls of said casings forming an annular upwardly extending hollow rim projecting above the bottom of the upper casing to provide a vapor chamber, and said vapor chamber having an aperture therein through which vapor may be withdrawn.

4. An evaporator comprising, a pair of cup-shaped concentric annular casings detachably interconnected at the peripheries thereof, said casings having cooperating surfaces spaced apart to provide a relatively thin evaporating chamber, the side walls of said casings forming a hollow rim extending upwardly beyond the point of peripheral interconnection and providing an annular vapor chamber, and said vapor chamber having an aperture therein through which vapor may be withdrawn.

HENRY S. BIMPSON.
ERNEST J. PALMER.

REFERENCES CITED

The following references are of record in the file of this patent:

UNITED STATES PATENTS

| Number | Name | Date |
|---|---|---|
| 842,788 | Huntoon | Jan. 29, 1907 |
| 895,761 | Huntoon | Aug. 11, 1908 |
| 2,342,062 | Schenk | Feb. 15, 1944 |
| 1,087,522 | Wolff | Feb. 17, 1914 |
| 2,004,375 | Martin | June 11, 1935 |
| 1,102,131 | Bleicken | June 30, 1914 |
| 96,029 | Oliver | Oct. 19, 1869 |
| Re. 21,129 | Fox | June 27, 1939 |
| 2,357,869 | Beckwith | Sept. 12, 1944 |

FOREIGN PATENTS

| Number | Country | Date |
|---|---|---|
| 820,705 | France | Aug. 9, 1937 |
| 681,133 | France | Jan. 27, 1930 |